United States Patent [19]

Jacob

[11] Patent Number: 4,775,190
[45] Date of Patent: Oct. 4, 1988

[54] HUB ASSEMBLY FOR DRIVABLE WHEEL

[76] Inventor: Werner Jacob, Briandring 29, 6000 Frankfurt/M.70, Fed. Rep. of Germany

[21] Appl. No.: 22,808

[22] Filed: Mar. 6, 1987

[30] Foreign Application Priority Data

Mar. 25, 1986 [DE] Fed. Rep. of Germany ....... 3609990

[51] Int. Cl.⁴ ...................... B60B 27/02; B60B 35/18; F16C 19/18
[52] U.S. Cl. ............................... 301/124 R; 180/259; 384/544; 384/505; 464/906
[58] Field of Search ............... 301/124 R, 124 H, 126, 301/131, 105 R; 180/258, 259; 73.3, 73.4; 384/499, 504–506, 543–544, 589; 464/178, 906

[56] References Cited

U.S. PATENT DOCUMENTS 4,300,651 11/1981 Krude .............................. 464/906 X
4,383,588 5/1983 Krude .............................. 180/259 X
4,417,643 11/1983 Guimbretiere ................... 180/259 X
4,473,129 9/1984 Guimbretiere ................... 301/109 X

FOREIGN PATENT DOCUMENTS 0192339 8/1986 European Pat. Off. ......... 301/124 R
3025757 2/1982 Fed. Rep. of Germany ... 301/105 R
2511950 3/1982 France ........................... 301/105 R
2499910 8/1982 France ........................... 301/105 R Primary Examiner—Robert B. Reeves
Assistant Examiner—Russell D. Stormer
Attorney, Agent, or Firm—Toren, McGeady & Associates

[57] ABSTRACT

A hub assembly for a wheel of a motor vehicle drivable by way of a constant velocity universal joint 3, the assembly comprising an outer joint member 5 integral with a flange 2 for wheel and brake disc fitting, and a rolling element bearing assembly 1 having an inner race 6 disposed on an outer circumferential surface of the joint member, wherein the joint member and flange are integrally formed by chipless deformation fo sheet metal, the flange having circumferentially spaced reinforcing formations 8 which on one side afford abutment surfaces for the bearing inner race and, on the other side of the flange, afford abutment surfaces for the wheel and/or brake disc.

10 Claims, 2 Drawing Sheets

HUB ASSEMBLY FOR DRIVABLE WHEEL

BACKGROUND TO THE INVENTION

1. Field of the Invention

This invention relates to a hub assembly for a wheel of a motor vehicle drivable by way of a constant velocity ratio universal joint, an outer member of the universal joint having an integral flange for wheel fitting and being rotatably supported by a rolling element bearing assembly having an inner race disposed on an outer circumferential surface of the joint member.

2. Description of Prior Art

In hitherto known hub assemblies of the above described kind, the joint outer member and flange is a relatively massive component whose rigidity is obtained by having a large wall thickness. The bearing assembly, which is usually a double row angular contact ball bearing, has a relatively heavy inner race. The resulting large weight of the assembly is particularly disadvantageous because it is unsprung weight. Designs where the inner race of the bearing is integral with the joint outer member have been proposed, but have a disadvantage in that it is necessary to select for the joint outer member and its integral flange a material which meets the requirements for the bearing race. Such materials are usually more expensive than those normally used for a wheel flange or a constant velocity ratio universal joint. In addition, with such one-component designs it is not possible to replace individual parts so that the entire expensive assembly has to be replaced if damage or wear to one part thereof occurs.

SUMMARY OF THE INVENTION

It is the object of the present invention to provide a hub assembly wherein the above disadvantages are overcome or reduced, i.e. which is of relatively reduced weight but adequate stiffness and strength, and in addition renders replacement of parts possible.

According to the invention, we provide a hub assembly for a drivable wheel of a motor vehicle, including a constant velocity ratio universal joint outer member having an integral flange for wheel fitting, and a rolling element bearing assembly rotatably supporting the joint member and having an inner race disposed on an outer circumferential surface of the joint member; wherein the outer joint member and flange are formed from sheet metal by chipless deformation thereof and the flange has circumferentially spaced axially deformed reinforcing formations which, on one side, provide abutment surfaces for the inner bearing race and in the region of which, on the other side of the flange, there are provided abutment surfaces for a wheel and/or a brake disc.

By chipless deformation of sheet metal to form the joint member and its integral flange, we mean processes such as deep drawing and/or precision pressing, which give the component its fundamental configuration without requiring removal of material in a machining operation (although it will be appreciated that finish machining processes and/or grinding of a part or parts thereof may be required).

The advantage of such an assembly is that the universal joint outer member with its integral flange is of light weight being formed from sheet metal, and yet the reinforcing formations ensure adequate stiffness for the flange and for the outer joint member. The inner bearing race disposed on the outer circumferential surface of the joint member provides support for the latter, which is further assisted by the abutment between the inner bearing race and the reinforcing formations.

Furthermore, the bearing inner race is separable from the outer joint member so that one or other thereof may be replaced without requiring the entire assembly to be replaced. The weight saving design of the assembly significantly reduces the unsprung weight in a vehicle to which the hub assembly is fitted.

Further to assist stiffening thereof, the outer joint member may have recesses distributed circumferentially about its outer circumferential surface. If the constant velocity ratio universal joint is of the type wherein torque is transmitted by balls engaging tracks in the members of the joint, such recesses may be disposed circumferentially between the ball tracks in the outer joint member. This enables the wall thickness around the entire circumferential surface of the joint outer member to be kept relatively uniform.

Between each two adjacent reinforcing formations, bosses may be formed in the flange, extending in the direction of the outer joint member and having bores for receiving fixing bolts, e.g. wheel fixing bolts. Bosses can be formed by punching during the formation of the outer joint member and flange, with adequate strength for receiving wheel fixing bolts.

The reinforcing formations may have bores for receiving fasteners for securing the inner bearing race. The latter may have axially extending holes for receiving such fasteners.

Preferably there are at least three reinforcing formations disposed about the flange. In a preferred embodiment, the number of such formations corresponds to the number of wheel fixing bolts.

The strength of the component comprising the outer joint member and flange is particularly favourable if, viewed in longitudinal section of the assembly, the flange where it is provided with said reinforcing formations and starting from the outer circumferential surface of the joint member, has a portion extending approximately at a right angle relative to said circumferential surface, followed by an arcuate or inclined portion extending away from the outer joint member and leading into a radially extending portion; whilst elsewhere between each two adjoining reinforcing formations the flange has a portion which extends at an angle away from the outer joint member and then leads into a radially extending flange portion.

The arcuate or inclined portion of the flange where it is provided with the reinforcing formations may be inclined at a different angle from the inclined portion of the flange between each adjacent pair of reinforcing formations. This feature has a further beneficial effect on the stiffness of the component. Where they lead into the remainder of the flange, the reinforcing formations are preferably of rounded configuration.

The inner bearing race may be a press fit on the outer circumferential surface of the outer joint member. This ensures that the outer joint member is adequately supported by the inner bearing race.

The bearing assembly is preferably a double row angular contact ball bearing, and may have a divided inner race and a one-part outer bearing race provided with a flange or other formations for connection to a wheel carrier member. The circumferentially extending joint line between the two parts of the divided inner bearing race may be inclined as viewed in section, so that two engaging frusto-conical faces are provided to centre the inner race parts relative to one another.

It would, of course, be possible for the outer bearing race to be of divided form with the inner bearing race in a single part.

The material thickness of the flange and/or outer joint member may vary around the circumference thereof, to provide a greater quantity of material where greatest loads have to be carried.

BRIEF DESCRIPTION OF DRAWINGS

The invention will now be described by way of example with reference to the accompanying drawings, of which.

DESCRIPTION OF PREFERRED EMBODIMENT

Figure 1:
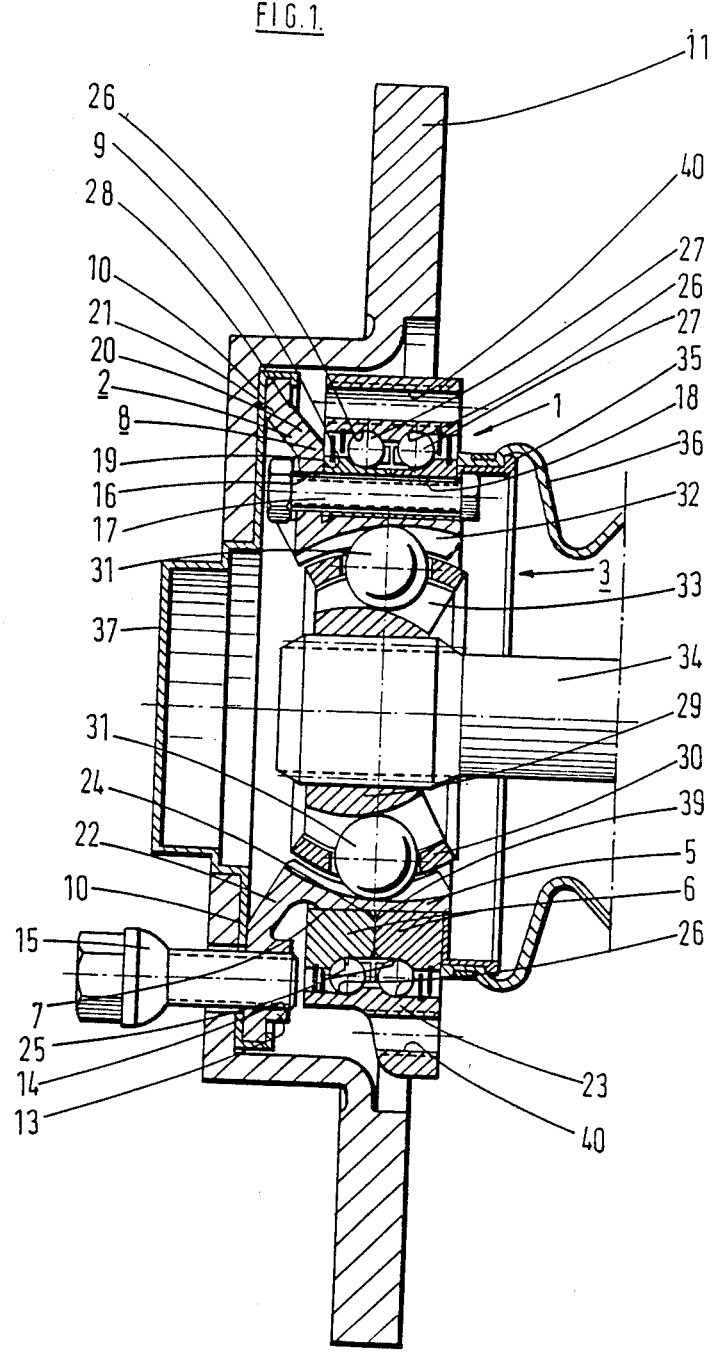
FIG. 1 is a longitudinal section through a hub assembly according to the invention.

Referring firstly to FIG. 1 of the drawings, there is illustrated a hub assembly whose main parts are a bearing indicated generally at 1 and a constant velocity ratio universal joint indicated generally at 3. The universal joint has an outer member 5 which is integral with a flange 2, and this component, which is produced from sheet metal by deep drawing or precision pressing, will be described in greater detail hereafter.

The constant velocity ratio universal joint 3 is of generally known type, and comprises the outer joint member 5, an inner joint member 29, and a cage 30 of annular form disposed between the two joint members. The inner joint member 29 has a plurality of circumferentially distributed axially extending ball-receiving tracks 33, and the outer joint member 5 has a corresponding number of ball tracks 32. A plurality of balls 31 are disposed one in each facing pair of tracks in the inner and outer joint members, and each ball occupies an aperture in the cage 30. Between its ball tracks 33, the inner joint member 29 has an outwardly facing part-spherical surface which engages with a corresponding internal part-spherical surface of the cage 30. The cage 30, in turn, has a part-spherical outer surface which is received in a corresponding inwardly facing part-spherical surface between the ball tracks 32 of the outer joint member 5. This arrangement an the illustrated shape of the ball tracks and cage provides, in known manner, for constant velocity ratio torque transmission between the inner and outer joint members while accommodating relative articulation therebetween.

A drive shaft 34 has a torque transmitting connection with the inner joint member 29.

The bearing 1 is a double row angular contact ball bearing and has an inner race in two parts 6 with an internal bore 39 in which is received the outer joint member 5. The outer joint member has an external circumferential surface 7, on which the inner bearing race parts 6 are a press fit. The one inner bearing race part 6 has an end face 28 which abuts a stop face 9 forming part of the flange 2, and the inner bearing race is held in position by bearing fixing bolts 17 which extend through circumferentially distributed axially extending bores 18 in the inner bearing race. The bolts 17 extend through bores 16 in the flange 2. The bolts 17 also secure a cap 35, for receiving one end of a flexible sealing boot 36 of which the other end is connected, not shown, to the shaft 34.

The inner bearing race parts 6 abut one another at a joint line 24 which in the illustrated embodiment is perpendicular to the rotational axis of the bearing. Alternatively, the joint line may be inclined as viewed in section, so that the two parts of the inner bearing race have frusto-conical joining faces which ensure that they are centred relative to one another. Separation of the inner bearing race into its two parts is achieved by splitting it after it has been manufactured to its final dimensions, such splitting being caused by applying pressure in the radial direction to a notched region between the parts 6.

The inner race parts 6 have respective tracks 25 for balls 27, which tracks are arranged diagonally opposite ball tracks 26 provided in a one piece outer bearing race 23. The outer bearing race 23 has circumferentially distributed projections with bores 40 for receiving fasteners for fixing the outer bearing race to a wheel carrier member forming part of a vehicle suspension.

Figure 2:
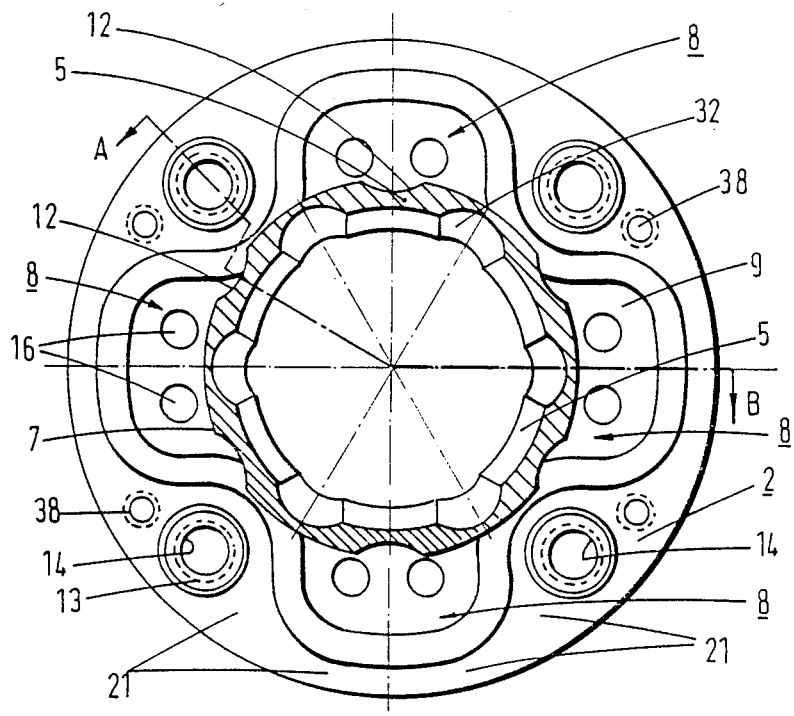
FIG. 2 is a cross-section through the outer joint member, with its integral flange, of the assembly.
Figure 3:
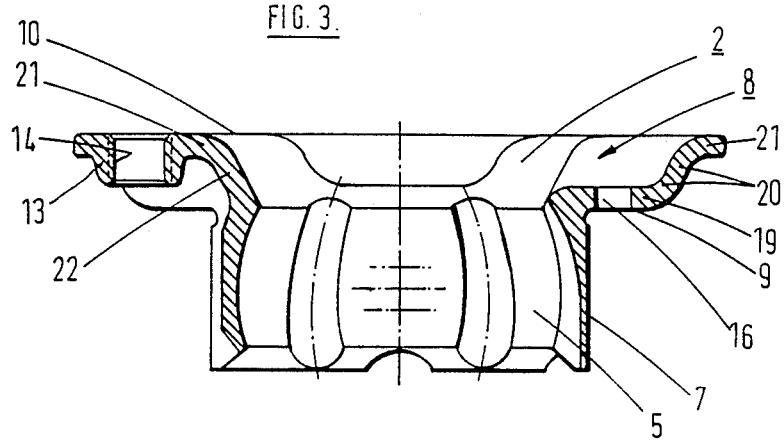
FIG. 3 is a section on the line A-B of FIG. 2.

The flange 2 is formed, as most clearly seen with reference to FIGS. 2 and 3, with four equally circumferentially spaced bosses 13 with threaded bores 14 which serve to receive wheel fixing bolts 15. Bosses 13 are produced by punching during, or possibly subsequent to, the deep drawing or precision pressing of the flange and outer joint member. The flange 2 also has circumferentially spaced bores 38 for receiving fasteners for fixing a brake disc 11 thereto. The brake disc 11 has a radially innermost axially displaced portion which is tightened against an abutment surface 10 on the outer side of the flange 2. Between the flange 2 and the radially innermost part of the brake disc 11, there is received a cap 37 which seals the constant velocity universal joint, and which has a step which centers the brake disc relative to it. The cap 37, in turn, is centered on the outer circumferential surface of the flange 2.

The flange 2 has four circumferentially spaced axially deformed reinforcing formations 8 which increase the rigidity of the flange. Viewed in longitudinal section through the reinforcing formations 8, and starting from the outer circumferential surface 7 of the outer joint member, these formations of the flange have a radially extending portion 19 which defines the stop face 9 for abutment by the inner bearing race, followed by an arcuate or inclined region 20 leading into a radially extending portion 21. Viewed in section between the reinforcing formations 8, the flange has an inclined portion 22 which extends away from the outer joint member, leading into a radially extending portion 21 having boss 13. Radially extending portion 21 provides an abutment surface for the brake disc 11, which in turn is abutted by the wheel to be secured to the hub assembly. The reinforcing formations 8 of the flange are radiused where they lead into the adjacent portions of the flange, which facilitates production and eliminates sharp edges which could provide starting points for cracks.

FIG. 2 shows how the outer circumferential surface 7 of the outer joint member is interrupted by recesses 12. Each recess 12 is arranged between two adjacent ball tracks 32, and is aligned with the part-spherical internal surface of the outer joint member between the ball tracks. The thickness of the material of the outer joint member is thus as uniform as possible, and the outer joint member is made as strong as possible.

I claim:

1. A hub assembly for a drivable wheel of a motor vehicle, comprising:

an outer joint member of a constant velocity ratio universal joint having a flange made as one piece and integral therewith for wheel fitting, said outer joint member having an outer circumferential surface; and a rolling element bearing assembly supporting said outer joint member for rotation about an axis, said bearing assembly having an inner race disposed on said outer circumferential surface of the joint member;

wherein said outer joint member and flange are of one piece of sheet metal, integrally formed from such sheet metal by chipless deformation thereof;

said flange includes circumferentially spaced axially deformed reinforcing formations, said reinforcing formations defining abutment surfaces for said bearing inner race on one side of the flange; and said flange defining abutment surfaces in the region of said reinforcing formations on the opposite side thereof, for at least one of a wheel and brake disc.

2. A hub assembly according to claim 1, wherein said outer joint member has axially extending recesses, distributed circumferentially about said outer circumferential surface thereof.

3. A hub assembly according to claim 1, wherein said flange comprises bosses circumferentially spaced between said reinforcing formations, said bosses extending axially in the direction of the outer joint member, and having bores for receiving wheel fixing bolts.

4. A hub assembly according to claim 1, wherein said reinforcing formations define respective bores for receiving fasteners for securing said inner bearing race.

5. A hub assembly according to claim 1, wherein there are at least three of said reinforcing formations.

6. A hub assembly according to claim 1, wherein, viewed in section parallel to said axis of the assembly, the flange where it is provided with one of said reinforcing formations and starting from the outer circumferential surface of the joint member, has a portion extending approximately at a right angle relative to said circumferential surface, followed by an arcuate or inclined portion extending away from the outer joint member and leading into a radially extending portion; and where between each two adjoining said reinforcing formations the flange has an inclined portion which extends at an angle away from the outer joint member and then leads into a radially extending flange portion.

7. A hub assembly according to claim 1, wherein said reinforcing formations are of rounded configuration where they lead into the remainder of the flange.

8. A hub assembly according to claim 1, wherein said inner bearing race is a press fit on said outer circumferential surface of the outer joint member.

9. A hub assembly according to claim 1, wherein said bearing assembly is a double-row angular contact ball bearing, said inner race thereof is of divided form, and an outer race thereof is of one piece form provided with formations for connection to a wheel carrier.

10. A hub assembly according to claim 1, wherein the flange and outer joint member has a material thickness which varies around the circumference thereof.

* * * * *